US005214360A

United States Patent [19]

Gonser et al.

[11] Patent Number: 5,214,360

[45] Date of Patent: May 25, 1993

[54] PROGRAMMABLE ADJUSTABLE CHAIR FOR MEDICAL AND DENTAL APPLICATIONS

[75] Inventors: Donald I. Gonser, Lancaster; Michael J. Butchko, Mechanicsburg, both of Pa.

[73] Assignee: Den-Tal-Ez, Inc., Valley Forge, Pa.

[21] Appl. No.: 851,095

[22] Filed: Mar. 13, 1992

[51] Int. Cl.[5] .......... H02P 1/00

[52] U.S. Cl. .......... 318/551; 318/467; 297/330

[58] Field of Search .......... 297/330, 354, 361; 318/280-286, 551, 603, 54, 59, 266, 267, 466-469, 625, 696

[56] References Cited

U.S. PATENT DOCUMENTS

| | | | |
|---|---|---|---|
| 2,133,160 | 10/1938 | Barlow . | |
| 2,814,703 | 11/1957 | Martin . | |
| 3,083,278 | 3/1963 | Mukai . | |
| 3,357,740 | 10/1967 | Vaughn et al. . | |
| 3,578,379 | 5/1971 | Taylor . | |
| 3,774,965 | 11/1973 | Brandt et al. . | |
| 3,804,460 | 4/1974 | Leffler . | |
| 3,823,979 | 7/1974 | Davis, Sr. . | |
| 3,866,973 | 2/1975 | Heubeck . | |
| 3,874,728 | 4/1975 | Weiland . | |
| 3,889,998 | 6/1975 | Weiland . | |
| 3,934,928 | 1/1976 | Johnson . | |
| 3,934,929 | 1/1976 | Rabinowitz . | |
| 3,934,931 | 1/1976 | Matsui et al. . | |
| 3,948,559 | 4/1976 | Hain et al. . | |
| 3,984,146 | 10/1976 | Krestel et al. . | |
| 4,083,600 | 4/1978 | Hirth . | |
| 4,128,797 | 12/1978 | Murata . | |
| 4,168,099 | 9/1979 | Jacobs et al. . | |
| 4,250,439 | 2/1981 | Hohmann | 318/603 X |
| 4,293,764 | 10/1981 | Amrhein . | |
| 4,319,099 | 3/1982 | Asher . | |
| 4,375,900 | 3/1983 | Tschibana et al. | 297/330 |
| 4,467,252 | 8/1984 | Takeda et al. | 297/330 X |
| 4,516,805 | 5/1985 | Leeper et al. . | |
| 4,527,976 | 7/1985 | Behringer et al. . | |
| 4,541,671 | 9/1985 | Broadhead et al. . | |
| 4,689,537 | 8/1987 | Mizuta et al. | 318/466 X |
| 4,722,566 | 2/1988 | Castellini . | |
| 4,771,139 | 9/1988 | DeSmet . | |
| 4,808,897 | 2/1989 | Saito et al. | 318/466 |
| 4,918,270 | 4/1990 | Orrico . | |
| 4,924,163 | 5/1990 | Sahamoto et al. | 318/466 X |
| 4,956,592 | 9/1990 | Schulte et al. | 318/286 X |
| 4,977,300 | 12/1990 | Schroeder . | |
| 4,983,901 | 1/1991 | Lehmer | 318/685 |
| 5,015,035 | 5/1991 | Stoeckl et al. . | |

*Primary Examiner*—Jonathan Wysocki
*Attorney, Agent, or Firm*—Howson and Howson

[57] ABSTRACT

A position programmable adjustable chair particularly useful in dental and medical procedures. The chair is hydraulically powered and controlled by microprocessors which enable chair seat and back positions to be memorized and automatically captured upon command by use of a single control button. The control button may be located either on the chair or on a footswitch. A sealed omnidirectionally operable footswitch is provided which is particularly suited for use in combination with the chair.

12 Claims, 5 Drawing Sheets

PROGRAMMABLE ADJUSTABLE CHAIR FOR MEDICAL AND DENTAL APPLICATIONS

FIELD OF THE INVENTION

The present invention relates to powered adjustable chairs, and more particularly, the present invention relates to position programmable powered chairs particularly suited for use in medical and dental applications.

BACKGROUND OF THE INVENTION

In the modern dental operatory, a powered chair is provided to enable a dentist, or dental assistant, to adjust the chair components into selected positions simply by pressing control buttons. Thus, the chair seat may be raised or lowered to provide an entry/exit position for ease of patient ingress and egress, and the chairback may be pivoted relative to the seat, depending upon the particular preference of the health professional and the procedure to be performed. Early in their development, such chairs were customarily preprogrammed at the factory to assume particular positions, but now some have the capability of being adjusted by the health professional to suit his/her particular preferences.

For instance, U.S. Pat. No. 4,168,099 issued to Jacobs discloses an examination chair particularly suited for use in gynecological examinations. The chair is preprogrammed at the factory to assume automatically a selected one of several standard gynecological examination positions. A footswitch is utilized to actuate the chair control mechanism to effect automatic operation. The chair does not appear to be capable of being programmed in situ by the health professional.

Early attempts to enable chairs to be adjusted in situ included control systems which operated by timing the operation of motors to bring the various chair components into preselected positions. A stated drawback of this approach was the imprecision with which the chair components could be positioned due to the lack of a positive indication of chair position relative to a programmed set point.

The aforementioned drawbacks were stated to be overcome by the control mechanism disclosed in U.S. Pat. No. 4,128,797 to Murata. In Murata, the chairback is provided with a series of control switches, including some manual positioning switches for operating the chair manually, a set switch, and an automatic positioning switch. Sensors are provided for detecting the positions of the various chair components to provide a memorized position when the set switch is actuated at a visually-observed chair position, so that when the automatic switch is actuated, the chair will move precisely to the pre-set position. A drawback of the chair disclosed in Murata is the use of electric motors and higher than desirable voltages in association with the chair sensors to provide the desired control inputs and motions.

In at least one currently commercially available programmable adjustable chair, a recessed set button is provided in a control console at the base of the chair to program a chair position. As a result, when the chair has been adjusted to a preselected position, using manual positioning switches, the health professional must kneel down on the floor and press the button with an implement to input the pre-selected chair position. While this chair may function satisfactorily for its intended purpose, this method of automatic programming is inconvenient to the health professional and, therefore, less than completely desirable. Furthermore, while a footswitch is provided for use in moving the chair components into various positions, the footswitch utilizes a rocker actuator which is not sealed against liquids that might be spilled onto the floor of the operatory adjacent to the footswitch and such a switch does not afford omnidirectional actuation.

OBJECTS OF THE INVENTION

With the foregoing in mind, a primary object of the present invention is to provide an improved programmable adjustable powered chair particularly suited for use by health professionals in the observation and treatment of patients.

Another object of the present invention is to provide a programmable powered chair which is capable of being programmed to assume selected adjusted positions by means of an actuator on either a footswitch or a chairback.

Yet another object of the present invention is to provide a unique dental operatory chair capable of being programmed by means of a single control actuator cooperable with an audible indicator tone generator in a control console mounted in the base of the chair to acknowledge program memorization capture and automatic operation arming.

A still further object of the present invention is to provide an improved footswitch that is omnidirectionally operable and impervious to liquids, yet which is durable, easy to use, straightforward to manufacture, and reliable in operation.

SUMMARY OF THE INVENTION

More specifically, the present invention provides a programmable adjustable chair for medical and dental applications. The chair has a programmable control module which controls the operation of hydraulic valves and actuators for displacing the chair seat and chairback independently in response either to actuation of a manual control switch or to an automatic position-program switch. The position-program switch both programs the chair to assume various selected positions and initiates automatic preselected chair position capture. A tone generator is associated with the control module and position-program switch for producing an audible tone corresponding to a preselected chair position during programming of the unit. A footswitch is also provided to enable the same control functions to be performed by the health professional by utilizing his/her foot instead of switch actuators on the chairback.

The footswitch includes a cover molded of flexible plastic material and mounting a series of button actuators on its topside. Each button actuator includes a live hinge formed integral with the cover so that when a button actuator is depressed, either axially or obliquely, it moves inwardly to engage a switch mounted inside the cover. To protect the switches against excessive button actuator deflection, they are carried on a plate resiliently mounted underneath the cover.

BRIEF DESCRIPTION OF THE DRAWINGS

The foregoing and other objects, features and advantages of the present invention should become apparent from the following description when taken in conjunction with the accompanying drawings, in which.

DESCRIPTION OF THE PREFERRED EMBODIMENT

Figure 1:
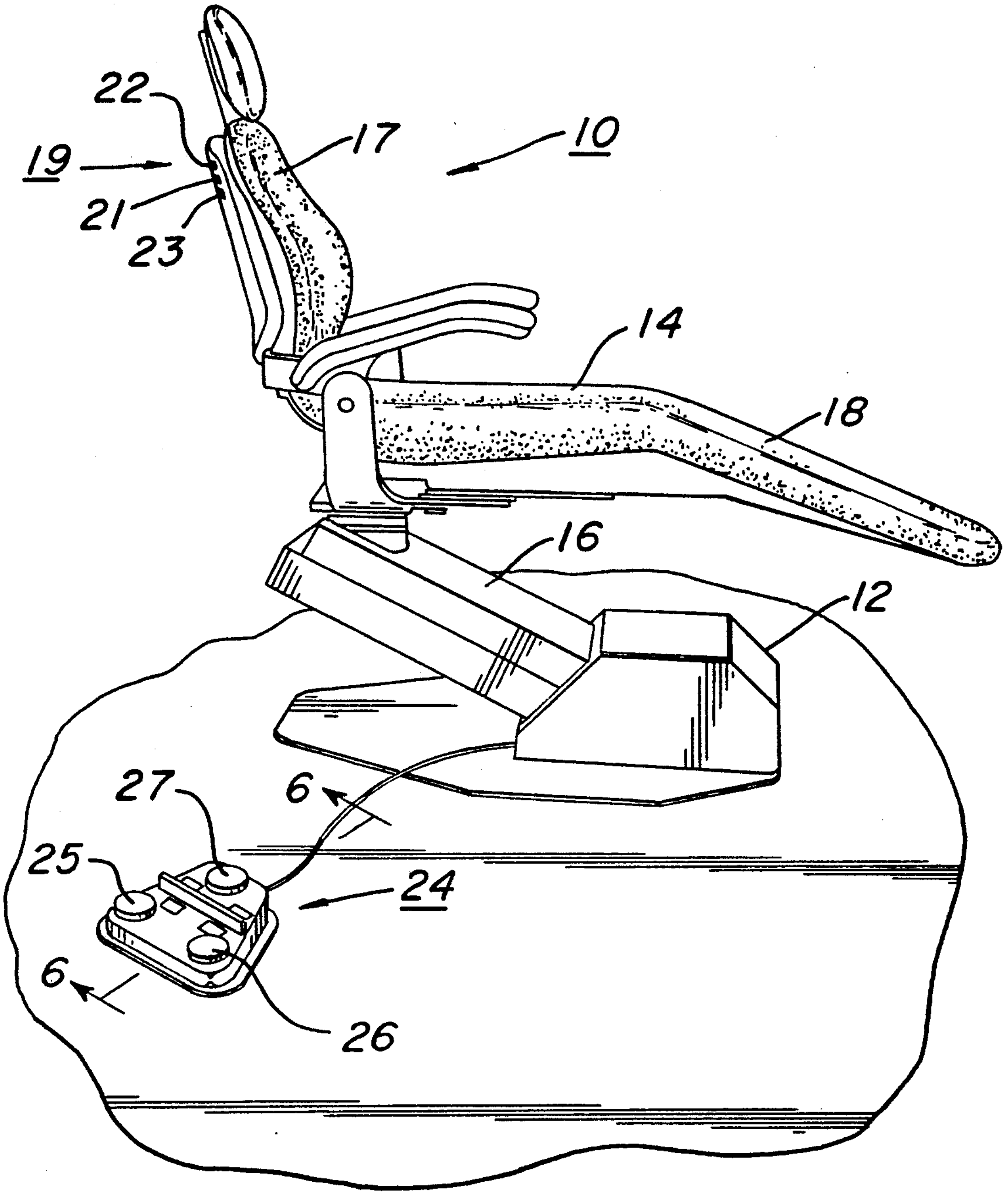
FIG. 1 is a side-elevational view of a programmable adjustable chair embodying the present invention.

Referring now to the drawings, FIG. 1 illustrates a chair 10 of the type which finds particular utility in connection with performing medical and dental procedures on patients. The chair 10 comprises a base 12, a seat 14 supported by the base and mounted for vertical movement between upper and lower limit positions by means of an arm 16 pivotally mounted to the base 12. The arm 16 is driven by an hydraulic actuator controlled by a solenoid valve (not shown). A backrest 17 is mounted to the seat 14 for pivotal movement between upright and recline limit positions and is pivoted by means of a separate hydraulic actuator controlled by a solenoid valve (not shown). A leg rest 18 is pivotally connected to the seat 14 and moves in conjunction with movement of the backrest 16. An hydraulic pump (not shown) is provided in the base 12 for driving the hydraulic actuators in response to actuation of the hydraulic control valves. A programmable electronic control module is contained in a control console 20 (FIG. 2) mounted in the chair base 12 for controlling movement of the various chair components as will be described.

For the purpose of operating the electronic control module, a series 19 of three momentary-contact push button switches 21, 22, 23 are provided along each side of the chairback. The middle switch 21 controls up and down movement of the seat base 14; the upper switch 22 controls pivotal movement of the backrest 13 and, therefore, the leg rest 18; and the lower switch 23 controls automatic movement of the seat base 14 to a programmed position. A footswitch 24 having corresponding button actuators 25, 26, and 27 is also provided to effect the same chair movements with the use of foot pressure rather than finger pressure.

As discussed herefore, the conventional programmable chair includes a control console having an electronic memory which operates in conjunction with resistance sensors associated with various chair components to enable chair positions to be memorized by separate actuation of a set button after the chairback and seat have been placed in the desired position by operation of the manual actuator buttons. This enables the chair to be programmed to assume a selected position, such as one which affords ready ingress/egress by the patient, and at least one other configuration which the health professional finds particularly desirable for the particular procedure to be performed. The drawbacks of a known commercially available chair of such construction are discussed supra.

According to the present invention, the improved chair 10 overcomes the drawbacks of known commercially available programmable adjustable powered chairs. To this end, an actuator operable from a location in close proximity with the chair is provided for cooperating with programmable control means both to program the chair to assume a selected position and to initiate capture of the memorized preselected position. In the present invention, the actuator includes either the chair back switch button 23 or the footswitch button 27. The actuators are electrically connected to a microprocessor 30 contained in the control console 20. See FIG. 2. The microprocessor 30 communicates with another micro processor 31 in the console 20. An indicator for producing a sensible signal indicative of position memorization input and of automatic chair position preselect is provided in the control console. In the disclosed embodiment, the sensible indicator includes a tone generator 32 which produces an audible tone. However, visual signals, such as light indicator could also be utilized in certain applications.

Figure 2:
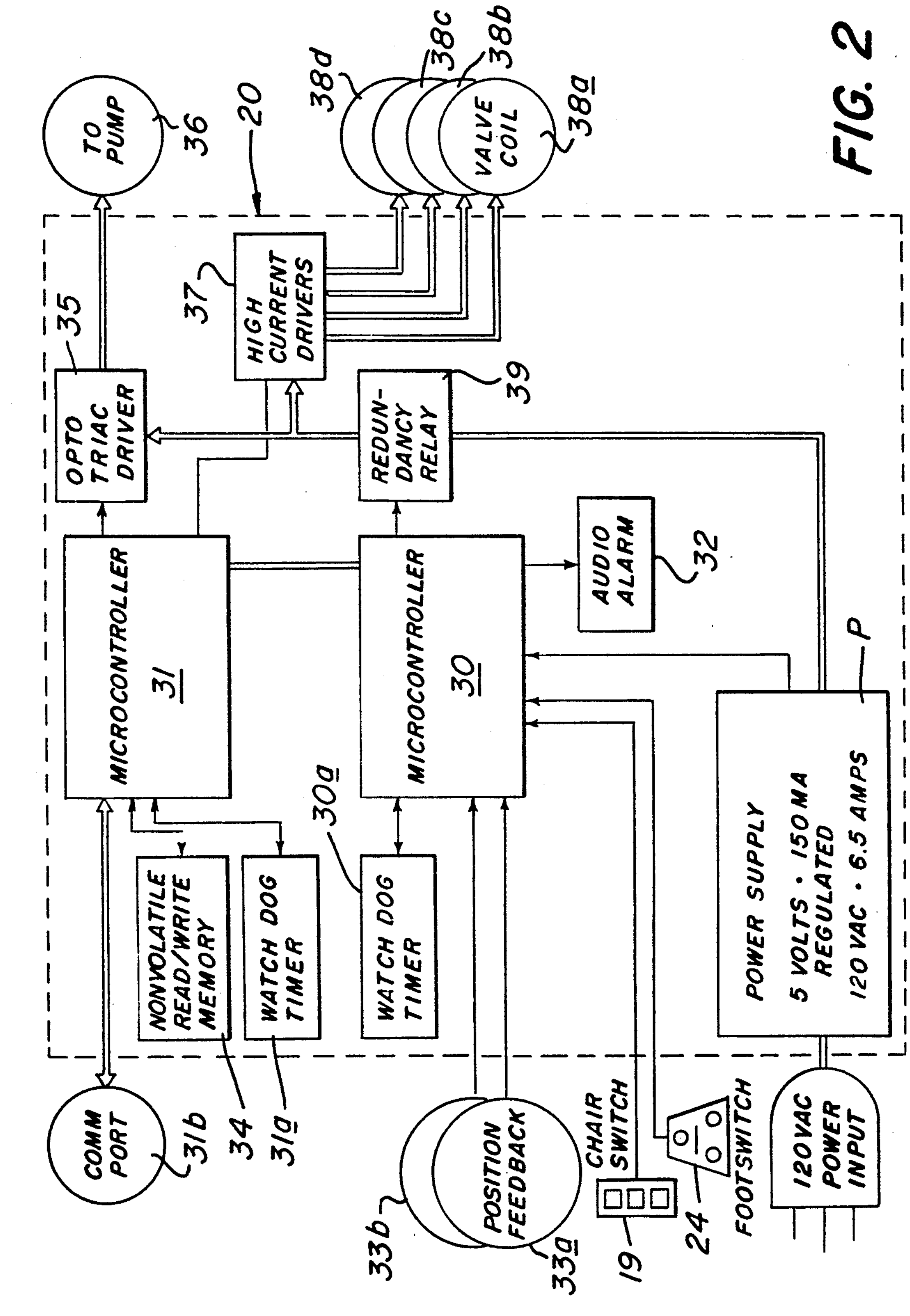
FIG. 2 is a block diagram illustrating the interconnection of various electrical and mechanical components of the control system.

The microprocessor 30 essentially functions to receive and process information produced by the chair switch 19, the footswitch 24 and chairback and seat position sensors indicated schematically as 33*a*, 33*b* in FIG. 2.

The microprocessor 31 essentially functions to process information supplied by the microprocessor 30 and to drive the various mechanical components of the system. For this purpose, the microprocessor 31 is connected to a non-volatile read/write programmable device 34 that stores chair position information and other information desirable for controlling the mechanical components of the system. The microprocessor 31 is connected via a opto-triac driver 35 to the hydraulic pump 36 that supplies the pressure fluid for displacing the two hydraulic actuators (not shown). The microprocessor 31 also is optically coupled to high current drives 37 which control the operation of the solenoid valves 38*a*, 38*b*, 38*c*, 38*d* connected in the hydraulic fluid circuit to control the motion of the two hydraulic actuators. A redundancy relay 39 is provided to shut down the pump 36 and valves 38*a*–38*d* in the event of malfunction.

A power supply unit P, watch dog timers 30*a* and 31*a*, and a communication port 31*b* is provided for purposes apparent to those skilled in the art. For instance, the communication port can be used for diagnostic functions, etc.

The various described electrical and mechanical components cooperate to perform the desired function of the invention, i.e. to enable position programming and automatic position capture to be performed by appropriately manipulating a single control button actuator 23 or 27 in the manner to be described.

To move the chair components, the chair seat 14 is elevated by pressing and holding the seat button 21 until the desired height is reached. A single beep sounds when the chair seat is elevated.

The chair seat 14 is lowered by pressing the seat button 21 twice and then holding the seat button 21 depressed until the desired position is reached. Two beeps sound when the chair seat is lowered.

The chair backrest 17 is pivoted toward a vertical position by pressing and holding button 22 until the desired position is reached. A single beep sounds when the chairback 17 moves toward a vertical position.

The chairback 17 is pivoted toward a horizontal position by pressing button 22 twice and then holding button 22 depressed until the desired position is reached. Two beeps sound when the chairback 17 moves toward a horizontal position.

To program an automatic chair position, the chair 10 is positioned to the proposed programmed position using seat and back buttons 21 and 22, respectively as described above. The AUTO button 23 is pressed once for position one, twice for position two, or three times for position three, while the chair is in one of the three positions respectively and is then held in the depressed position. First, one may select either one, two or three beeps to indicate the chair position number desired for programming, or to be programmed. To memorize, or program a new or different position, the AUTO button 23 is continuously depressed and held in the depressed position for approximately five seconds. An audible signal sounds to indicate that the AUTO button 23 can be released. After releasing the AUTO button 23, an audible signal of a different tone sounds to indicate to the operator that the new position has been programmed successfully.

To access automaticly a preselected chair position, the AUTO button 23 is pressed once for position one, twice for position two, or three times for position three, and then immediately released. An audible signal is produced each time the button 23 is depressed. The chair automatically positions itself to the preprogrammed position. When the chair reaches the preprogrammed chair position another audible signal is emitted.

Figure 3:
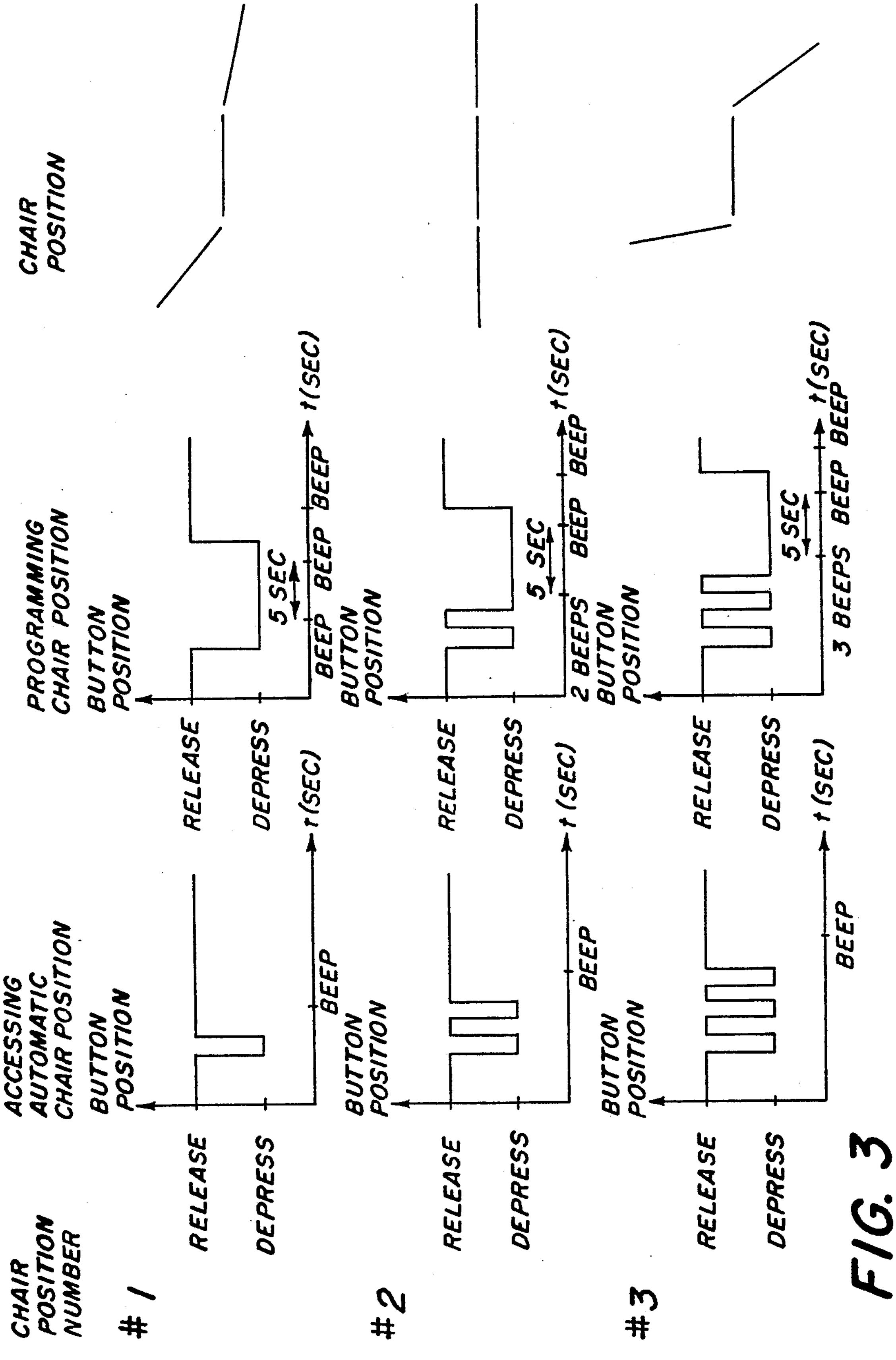
FIG. 3 is schematic diagram illustrating the manner in which the program-position actuators are employed in combination with a programmable control module and tone generator mounted in the base of the chair both to program the chair and to operate it in an automatic capture mode.

The above procedures are illustrated schematically in FIG. 3 which illustrates actuator, or button, position relative to time, and exemplary chair positions. For instance, to program the chair 10 to assume position No. 1 automatically, either the AUTO chair button 23 or AUTO footswitch button 27 is depressed in the manner and for the time intervals indicated, after the chair seat 14 and chair backrest 17 have been placed in the desired position by operation of the manual position buttons, such as buttons 21 and 22. After programming in the manner noted in the "PROGRAMMING" column of FIG. 3, the AUTO button can be actuated as indicated in the "ACCESSING AUTOMATIC" column to cause the chair 10 to capture the position indicated in the "CHAIR POSITION" column. In the schematic of FIG. 3, position No. 1 is shown as a first typical working position, position No. 2 is shown as a second typical working position, and position No. 3 is shown as an entry/exit position. It should be apparent, however, that a variety of other chair positions can be programmed to suit the particular preference of either the dentist or his/her assistant.

In the embodiment illustrated and described, the control system operates hydraulic valves and actuators. However, the invention is capable of utilizing electromechanical, pneumatic and magnetic actuators (servomotors). Also, while a system for controlling chair seat and back motion is disclosed, it should be apparent that a chair tilt function can also be incorporated with appropriate modifications in the actuators and control system. Moreover, more than the disclosed three automatic positions can be incorporated, if desired. The three positions are disclosed for purposes of providing an example of some desirable positions.

Figure 4:
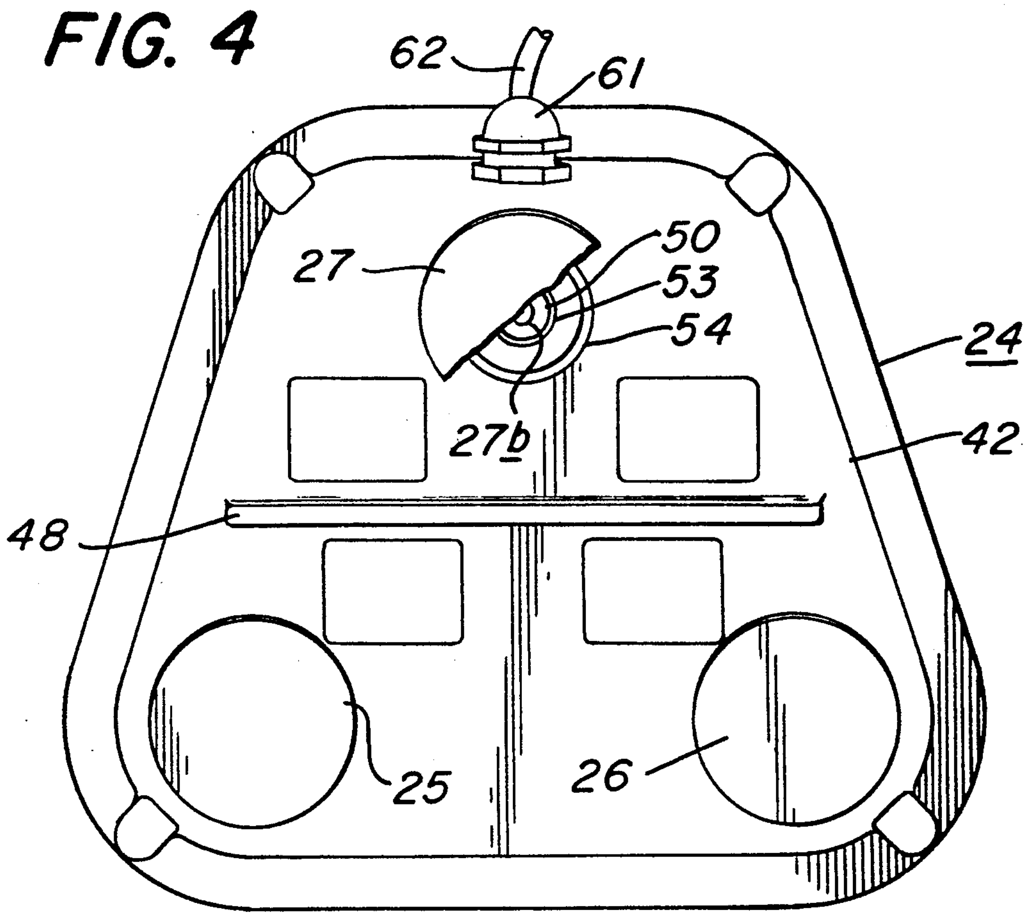
FIG. 4 is a plan view of the footswitch illustrated in FIG. 1.
Figure 5:
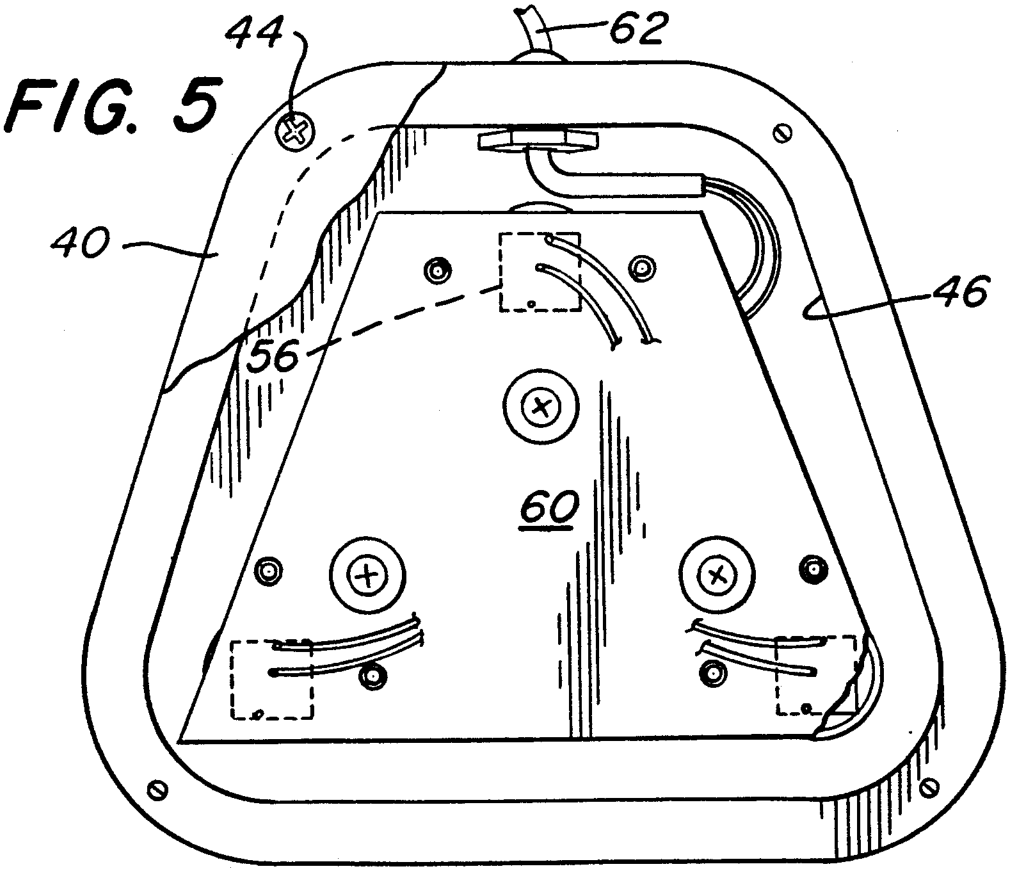
FIG. 5 is an inverted plan view of the footswitch with portions broken away to expose interior details of construction.

According to another aspect, the present invention provides the improved footswitch 24 which is particularly suited for use in combination with the chair 10 described above. As best seen in FIGS. 4 and 5, the footswitch 24 comprises a base plate 40 adapted to lay flat on a floor and a molded plastic cover 42 overlying the base plate 40 and fastened thereto by screws, such as the screw 44, to form a closed watertight chamber, or housing 46. In plan view, the footswitch has a generally trapezoidal configuration, and in side elevation is somewhat wedge-shaped. See FIG. 6. The topside of the cover 42 mounts a plurality of circular buttons such as the buttons 25, 26, and 27 described, supra. Preferably, the automatic position button 27 is located at the apex of the cover 42 and is separated from the seat and back buttons 25 and 26, respectively by means of a raised elongate rib 48 extending upwardly from the top surface of the cover 42 to an elevation slightly higher than the top surfaces of the buttons 25–27. The rib 48 is engaged by the ball of the foot of the dentist or his/her assistant to prevent simultaneous engagement of all the buttons. See FIG. 6.

Figure 6:
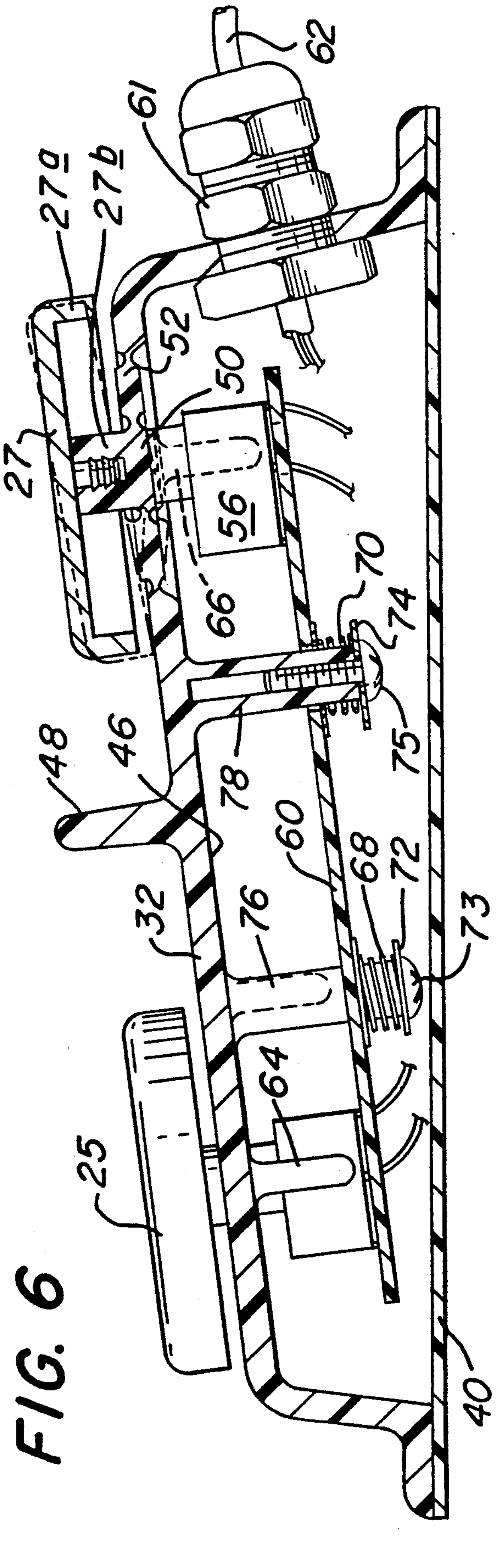
FIG. 6 is an enlarged sectional view taken on line 6—6 of FIG. 1.
Figure 7:
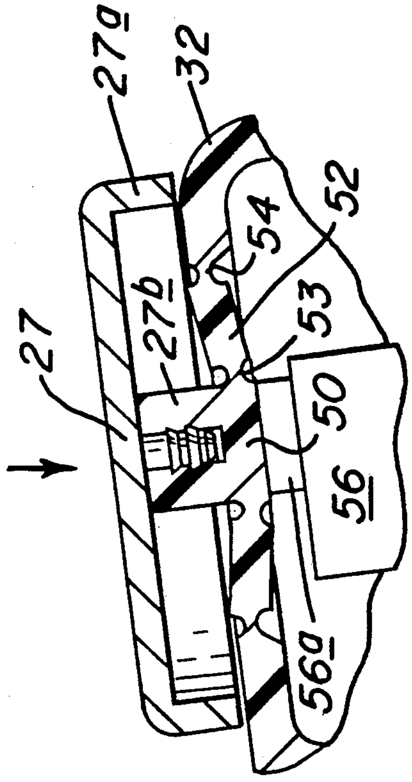
FIG. 7 is a greatly enlarged fragmentary sectional view of a portion of the footswitch in an active position.

Referring now to FIG. 6, each of the buttons, such as the button 27, includes a downturned peripheral flange 27*a* which is spaced from the top surface of the cover by means of a stem 27*b*. The stem projects upwardly from a central region 50 of an annular live hinge 52 formed integral with the cover by two circular rings 53 and 54 of reduced thickness best illustrated in FIGS. 4 and 7. This provides sufficient flexibility to enable the stem 27*b* to be displaced downwardly relative to the plane of the cover 42 when the button 27 is displaced normal to the plane of the cover as illustrated in FIG. 7, and also to move downwardly in response to a tilting action of the button 27 when engaged off-center from the stem 27*b* as illustrated in phantom lines in FIG. 6. Compare FIGS. 6 and 7. The cover 42 is preferably fabricated of polypropylene which has sufficient memory to restore the button to the position illustrated in solid lines in FIG. 6 after foot pressure is removed.

A series of three momentary contact microswitchs are mounted in the chamber 46 below the button stems and live hinge regions. Each switch, such as the switch 56, has an operator 56*a* with a normal path of actuation movement that is aligned with the button stem motion indicated by the arrow in FIG. 7. The switch operator 56*a* has an upper surface located in close proximity with the undersurface of the cover 42 so that relatively small deflection of the cover 42 in the region 50 centrally of live hinge can depress the operator to close the switch 56.

In order to prevent the switch 56 from being damaged in the event of application of excessive foot pressure, and hence excessive downward displacement of the central region 50 of the live hinge 52, resilient means is provided to mount the switches in the housing. To this end, as best seen in FIG. 6, the switches are fastened on the topside of a trapezoidal mounting panel 60 which is electrically connected via a coupling 61 to an electrical cable 62 releasably connected at its free end to the control console 20 in the base 12 of the chair 10. The mounting panel 60 is held in position in the chamber 46 by means of one, or more, spacers 64, 66, depending from the inside of the cover 42 to engage the upper surface of the mounting panel 60. The mounting panel 60 is maintained in engagement with the spacers 64, 66, by means of helical compression springs 68, 70 which engage the underside of the mounting panel 60 and are compressed between it and washers 72, 74 fastened by screws 73 and 75 to the terminal ends of posts 76, 78 which depend from the underside of the cover 42 through holes in the mounting plate 60. While this form of resilient mounting is preferred, other arrangements may be utilized, such as compressible pads between the mounting plate 60 and the base plate 40, extension springs connecting the mounting plate 40 to the cover 42, and the like.

The above-described switch construction provides a number of advantages. First of all, the switches contained within the chamber are completely sealed against liquid contact. Thus, if desired, the entire footswitch unit can be cleaned by a liquid disinfectant. The button actuators cooperate with their respective live hinges to enable the switches to be actuated by foot pressure applied omnidirectionally, and without the necessity of pushing the button straight downwardly against the cover. The raised rib on the cover supports the ball of the foot to prevent all of the actuator buttons from being depressed simultaneously, and also facilitates selective operation of the buttons. The footswitch is relatively simple in construction and, therefore, straightforward to manufacture utilizing molded plastic components that can be assembled readily.

While a preferred embodiment of a chair and a footswitch have been described in detail, various modifications, alterations and changes may be made without departing from the spirit and scope of the present invention as defined in the appending claims.

We claim:

1. In a powered, programmable chair having a base, a seat supported by the base for vertical movement between upper and lower limit positions, a back mounted to the seat for pivotal movement between upright and recline limit positions, means for displacing the seat and back into selected positions between their respective limits and programmable control means for controlling said seat and back displacements, the improvement comprising a single dual function switch operable from a location in proximity with the chair for cooperating with said programmable control means for both causing selected chairback and seat positions to be memorized in said programmable control means and for initiating automatic capture of a selected one of said positions, and indicator means operable in response to said switch and said programmable control means for cooperating therewith to provide different sensible indications of different selected seat and back position memorizations, whereby dual functions can be performed by utilizing the same actuator.

2. The chair according to claim 1 wherein said indicator means provides an audible sensible indication of position memorization and arming for automatic position capture.

3. The chair according to claim 2 wherein said actuator means includes a switch on said chairback, and a footswitch located adjacent said base, either of which is operable to perform said actuator means functions.

4. The chair according to claim 1 wherein said single dual function switch is a footswitch comprising a sealed housing having a molded cover with at least one integral annular flexible hinge region, a momentary contact switch assembly resiliently mounted in said housing beneath said flexible hinge region, and an actuator button connected centrally of said flexible hinge region for displacing it downwardly to actuate said switch assembly, said resilient switch assembly mounting accommodating displacement of said switch in response to excessive foot pressure.

5. In a powered, programmable chair having a base, a seat supported by the base for vertical movement between upper and lower limit positions, a back mounted to the seat for pivotal movement between upright and recline limit positions, means for displacing the seat and back into selected positions between their respective limits, and programmable control means for controlling said seat and back displacements, the improvement comprising a single dual function switch for cooperating with said programmable control means for both inputting a plurality of selected memorized chairback and seat positions to said programmable control means and initiating automatic capture of a selected one of said plurality of positions, and indicator means cooperable with said actuator and said programmable control means to provide a sensible indication of position memorization and initiation of arming for automatic position capture.

6. The chair according to claim 5 wherein said switch is located on said chair.

7. The chair according to claim 5 wherein said switch is a footswitch.

8. The chair according to claim 5 wherein said switch is a sealed footswitch comprising a housing having a molded cover with at least one integral annular flexible hinge region, a momentary contact switch assembly mounted in said housing below said hinge region, means resiliently mounting said switch assembly in said housing, and an actuator button projecting upwardly from said hinge region for engagement by a person's foot, whereby ordinary foot pressure on the button can actuate the switch while excessive foot pressure is accommodated by the resilient mounting means to prevent damage to the switch assembly.

9. In a powered, programmable chair having a base, a seat supported by the base for vertical movement between upper and lower limit positions, a back mounted to the seat for pivotal movement between upright and recline limit positions, means for displacing the seat and back into selected positions between their respective limits, and programmable control means for controlling said seat and back displacements, the improvement comprising a single dual function switch for both inputting a plurality of pre-selected chairback and seat positions into memory in said programmable control means and initiating automatic capture of a selected one of said plurality of positions, and audible indicator means operable in response to operation of said switch and programmable control means for providing separate identifying signals corresponding to different memorized ones of said plurality of positions.

10. The chair according to claim 9 wherein said switch is a sealed footswitch comprising a housing having a molded cover with at least one integral annular flexible hinge region, a momentary contact switch assembly mounted in said housing below said hinge region, means resiliently mounting said switch assembly in said housing, and an actuator button projecting upwardly from a central portion of said hinge region for engagement by a person's foot, whereby ordinary foot pressure on the button can actuate the switch while excessive foot pressure is accommodated by the resilient mounting means to prevent damage to the switch.

11. The chair according to claim 9 wherein said audible indicator means includes means for generating discrete tones providing separate identifying signals.

12. In a powered, programmable chair having a base, a seat supported by the base for movement between limit positions, a back mounted for pivotal movement between upright and recline limit positions, means for displacing at least the seat and the back into selected positions between their respective limits and programmable control means for controlling said seat and back displacements, the improvement comprising a single dual function switch operable from a location in proximity with the chair for cooperating with said programmable control means for both causing selected chairback and seat positions to be memorized in said programmable control means and for initiating automatic capture of a selected one of said positions, said programmable control means storing in memory a plurality of selected memorized chairback and seat positions and initiating automatic capture of a selected one of said plurality of positions in response to predetermined operations of said switch, said chair also including indicator means cooperable with said switch and said programmable control means to provide a sensible indication of position memorization and initiation of arming for automatic position capture, said sensible indication providing separate discrete audible signals corresponding to each preselected memorized chairback and seat position, whereby dual functions can be performed by utilizing the same actuator.

* * * * *